United States Patent
Satonaka (10) Patent No.: US 7,903,842 B2
(45) Date of Patent: Mar. 8, 2011

(54) TARGET POSITION SETTING DEVICE AND PARKING ASSIST DEVICE WITH THE SAME

(75) Inventor: Hisashi Satonaka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1026 days.

(21) Appl. No.: 11/663,065

(22) PCT Filed: Apr. 19, 2006

(86) PCT No.: PCT/JP2006/008184
§ 371 (c)(1),
(2), (4) Date: Mar. 16, 2007

(87) PCT Pub. No.: WO2006/115139
PCT Pub. Date: Nov. 2, 2006

(65) Prior Publication Data
US 2009/0123028 A1    May 14, 2009

(30) Foreign Application Priority Data

Apr. 22, 2005   (JP) ................................. 2005-124665

(51) Int. Cl.
*G06K 9/00* (2006.01)
(52) U.S. Cl. ..... 382/104; 382/103; 382/106; 340/932.2; 340/937; 340/943; 340/435; 340/436; 180/167; 180/199; 180/204; 701/1; 701/300; 701/301; 701/302
(58) Field of Classification Search ......................... None
See application file for complete search history.

(56) References Cited

U.S. PATENT DOCUMENTS

| | | | | |
|---|---|---|---|---|
| 4,931,930 A | * | 6/1990 | Shyu et al. | 701/36 |
| 5,530,420 A | * | 6/1996 | Tsuchiya et al. | 340/435 |
| 5,941,934 A | * | 8/1999 | Sato | 701/217 |
| 6,078,849 A | * | 6/2000 | Brady et al. | 701/28 |
| 6,424,895 B1 | * | 7/2002 | Shimizu et al. | 701/41 |
| 6,476,730 B2 | * | 11/2002 | Kakinami et al. | 340/932.2 |
| 6,483,429 B1 | * | 11/2002 | Yasui et al. | 340/435 |
| 6,662,101 B2 | * | 12/2003 | Adachi | 701/201 |
| 6,778,891 B2 | * | 8/2004 | Tanaka et al. | 701/41 |
| 6,792,147 B1 | * | 9/2004 | Saka et al. | 382/199 |

(Continued)

FOREIGN PATENT DOCUMENTS

DE    100 37 130 A1    4/2001

(Continued)

*Primary Examiner* — Vikkram Bali
*Assistant Examiner* — Julian D Brooks
(74) *Attorney, Agent, or Firm* — Oblon, Spivak, McClelland, Maier & Neustadt, L.L.P.

(57) ABSTRACT

A target position setting device includes a distance meter, an imager, first and second calculating portions, a determination portion, and a setting portion. The distance meter measures a distance to an object around a vehicle. The imager takes an image of an environment around the vehicle. The first calculating portion calculates a first candidate of a target position of the vehicle according to a measuring result of the distance meter. The second calculating portion calculates a second candidate of the target position of the vehicle according to an imaging result of the imager. The determination portion determines whether a relationship between the first candidate and the second candidate meets a given condition. The setting portion sets the target position according to the second candidate of the target position when the determination portion determines that the relationship between the first candidate and the second candidate meets the given condition.

16 Claims, 8 Drawing Sheets

U.S. PATENT DOCUMENTS

| | | | |
|---|---|---|---|
| 6,929,082 B2 * | 8/2005 | Kataoka et al. | 180/204 |
| 7,043,346 B2 * | 5/2006 | Kubota et al. | 701/28 |
| 7,085,634 B2 * | 8/2006 | Endo et al. | 701/36 |
| 7,366,595 B1 * | 4/2008 | Shimizu et al. | 701/301 |
| 7,486,203 B2 * | 2/2009 | Tanaka et al. | 340/932.2 |
| 2003/0122687 A1 * | 7/2003 | Trajkovic et al. | 340/932.2 |
| 2003/0151526 A1 * | 8/2003 | Tanaka et al. | 340/932.2 |
| 2005/0049766 A1 * | 3/2005 | Tanaka et al. | 701/36 |

FOREIGN PATENT DOCUMENTS

| | | | |
|---|---|---|---|
| FR | 2 771 500 | | 5/1999 |
| JP | 10 31799 | | 2/1998 |
| JP | 11 66493 | | 3/1999 |
| JP | 11 105686 | | 4/1999 |
| JP | 11 212640 | | 8/1999 |
| JP | 2002 170103 | | 6/2002 |
| JP | 2002 172988 | | 6/2002 |
| JP | 2002170103 | * | 6/2002 |
| JP | 2003 63337 | | 3/2003 |
| JP | 2003-276541 | | 10/2003 |
| JP | 2004 108944 | | 4/2004 |
| JP | 2004-306814 | | 11/2004 |

* cited by examiner

TARGET POSITION SETTING DEVICE AND PARKING ASSIST DEVICE WITH THE SAME

TECHNICAL FIELD

This invention generally relates to a target position setting device for setting a target position of a vehicle and a parking assistance device having the target setting device.

BACKGROUND ART

Japanese Patent Application Publication No. 2004-108944 (hereinafter referred to as Document 1) discloses an obstacle detection device that detects an obstacle such as a vehicle or a sidewall with use of a distance meter using ultra sonic. The obstacle detection device can detect a position of an obstacle according to a distance to the obstacle detected by the distance meter using ultra sonic. And the obstacle detection device can detect a parking position of a vehicle.

Japanese Patent Application Publication No. 11-105686 (hereinafter referred to as Document 2) discloses an automatic parking device that sets a stopping position of a vehicle according to a white line recognized by an imager. The automatic parking device can determine a parking position in a parking area where an obstacle is not provided, and can move a vehicle automatically.

However, the distance meter of Document 1 has an accuracy problem of object recognition, although the distance meter can recognize an object from a relatively far point. In addition, the distance meter cannot detect the parking position accurately when the vehicle detected by the distance meter is inclined. The imager of Document 2 is affected by a recognition error caused by a step or a slope in a case where the imager takes an image of the white line from a far point, although the imager can set an accurate parking position according to the white line. That is, the recognition accuracy changes largely with a movement of a vehicle, and it is difficult to detect a timing of determining of the parking position.

The present invention provides a target position setting device and a parking assistance device having the target position setting device that can set an accurate target position at an adequate time.

DISCLOSURE OF THE INVENTION

In exemplary embodiments, a target position setting device includes a distance meter, an imager, a first calculating portion, a second calculating portion, a determination portion and a setting portion. The distance meter measures a distance to an object around a vehicle. The imager takes an image of environment around the vehicle. The first calculating portion calculates a first candidate of a target position of the vehicle according to a measuring result of the distance meter. The second calculating portion calculates a second candidate of the target position of the vehicle according to an imaging result of the imager. The determination portion determines whether a relationship between the first candidate of the target position and the second candidate of the target position meets a given condition. The setting portion sets the target position according to the second candidate of the target position when the determination portion determines that the relationship between the first candidate of the target position and the second candidate of the target position meets the given condition.

In the target position setting device, the distance to the object around the vehicle is measured by the distance meter. The environment around the vehicle is taken by the imager. The first candidate of the target position is calculated according to the measuring result of the distance meter by the first calculating portion. The second candidate of the target position is calculated according to the imaging result of the imager by the second calculating portion. The target position is set according to the second candidate of the target position, when the determination portion determines that the relationship between the first candidate of the target position and the second candidate of the target position meets the given condition. In this case, it is possible to set an accurate target position at an adequate time according to the environment around the vehicle taken by the imager, because the target position is set according to the second candidate of the target position after the relationship between the first candidate of the target position and the second candidate of the target position meets the given condition.

In the exemplary embodiment, the target position setting device may includes a provisional setting portion. The provisional setting portion may set the target position according to the first candidate of the target position when the determination portion determines that the relationship between the first candidate of the target position and the second candidate of the target position does not meet the given condition. The setting portion may set the target position again according to the second candidate of the target position when the determination portion determines that the relationship between the first candidate of the target position and the second candidate of the target position meets the given condition after the provisional setting portion sets the target position according to the first candidate of the target position. In this case, the target position is set by the provisional setting portion, even if the relationship between the first candidate of the target position and the second candidate of the target position does not meet the condition. A first target position is therefore set at an early time. And it is possible to set a final target position accurately.

In the exemplary embodiment, the setting portion may change the target position gradually from the first candidate of the target position to the second candidate of the target position. In this case, rapid changing of the target position is prevented. In the exemplary embodiment, the given condition may mean a case where a distance between the first candidate of the target position and the second candidate of the target position is smaller than a given value for more than a given time. In this case, it is possible to set the accurate target position after the imaging result of the imager is reliable.

In exemplary embodiments, a parking assistance device includes a target position setting device and a steering assistance portion. The target position setting device is of any of claims 1 to 4. The steering assistance portion starts a steering assistance by an automatic steering when the determination portion determines that the relationship between the first candidate of the target position and the second candidate of the target position meets the given condition.

In the parking assistance device, the distance to the object around the vehicle is measured by the distance meter. The environment around the vehicle is taken by the imager. The first candidate of the target position is calculated according to the measuring result of the distance meter by the first calculating portion. The second candidate of the target position is calculated according to the imaging result of the imager by the second calculating portion. The target position is set according to the second candidate of the target position and the steering assistance is started by the steering assistance portion, when the determination portion determines that the relationship between the first candidate of the target position and the second candidate of the target position meets the given condition. In this case, it is possible to set an accurate target position according to the environment around the vehicle taken by the imager at an adequate time, because the target position is set according to the second candidate of the target position after the relationship between the first candidate of the target position and the second candidate of the target position meets the given condition. And the automatic steering is processed accurately, because the automatic steering is processed after the accurate target position is set.

In the exemplary embodiment, the parking assistance device may include a selection portion that determines whether the steering assistance by the steering assistance portion is to be processed. In this case, it is possible to prevent the automatic steering undesired for the driver. In the exemplary embodiment, the parking assistance device may include an information portion that informs the starting of the steering assistance to a driver when the steering assistance portion starts the steering assistance. In this case, it is possible to prevent the automatic steering undesired for the driver.

EFFECT OF THE INVENTION

In accordance with the present invention, it is possible to set an accurate target position according to an environment around a vehicle taken by an imager at an adequate time.

BRIEF DESCRIPTION OF THE DRAWINGS

Exemplary embodiments of one or more aspects of the invention will be described with reference to the following drawings, wherein.

BEST MODE FOR CARRYING OUT THE INVENTION

First Embodiment

Figure 1:
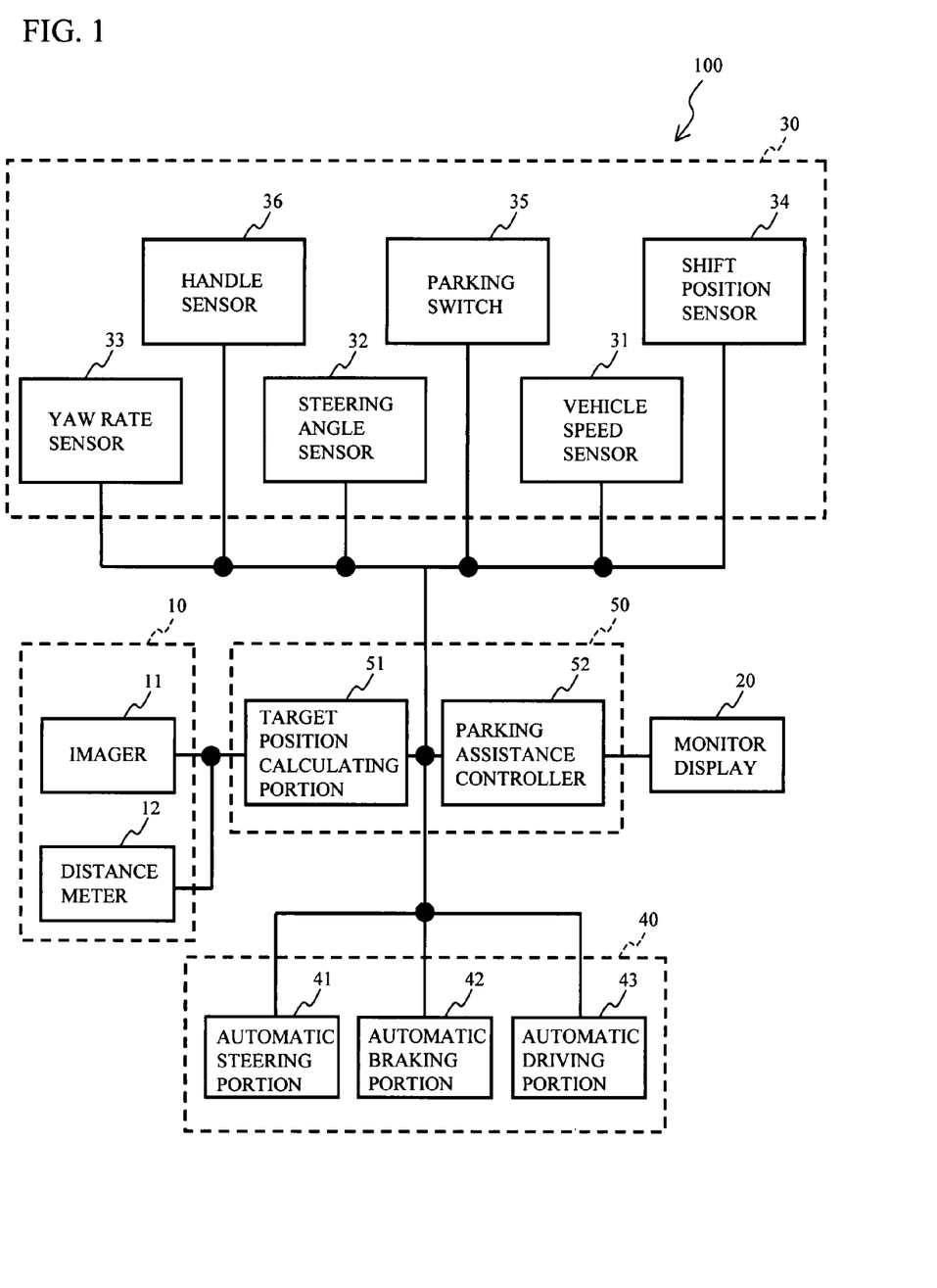
FIG. 1 illustrates a block diagram of an overall configuration of a parking assistance device in accordance with a first embodiment.

FIG. 1 illustrates a block diagram of an overall configuration of a parking assistance device 100 in accordance with a first embodiment. As shown in FIG. 1, the parking assistance device 100 has a target position sensor portion 10, a monitor display 20, a vehicle state sensor portion 30, an automatic steering portion 40, and a controller 50.

The controller 50 has a central processing unit (CPU), a read only memory (ROM), a random access memory (RAM) and so on. The controller 50 has a target position calculating portion 51 and a parking assistance controller 52. The target position calculating portion 51 calculates a target position X of a vehicle (for example, center position of a rear wheel shaft of the vehicle at a stopping position). The parking assistance controller 52 controls a parking assistance by an automatic steering of the vehicle. The details are given later. The target position sensor portion 10 and the target position calculating portion 51 corresponds to a target position setting device.

The target position sensor portion 10 has an imager 11 and a distance meter 12. The imager 11 has a charge coupled device (CCD) camera that takes an image of scenery within a given angle range backward of the vehicle. The imager 11 converts the image of the scenery into an image signal and gives the image signal to the target position calculating portion 51 of the controller 50. The distance meter 12 has an ultra sonic sonar, a radar and so on. The distance meter 12 measures a distance to a target object and gives the measured distance to the target position calculating portion 51. The monitor display 20 displays information for assisting a driving of a driver. For example, the monitor display 20 displays an image taken by the imager 11.

The vehicle state sensor portion 30 has a vehicle speed sensor 31, a steering angle sensor 32, a yaw rate sensor 33, a shift position sensor 34, a parking switch 35 and a handle sensor 36. The vehicle speed sensor 31 is provided at each wheel of the vehicle. The vehicle speed sensor 31 detects a wheel speed and gives the detected speed to the parking assistance controller 52 of the controller 50. The steering angle sensor 32 detects a steering angle of a handle (not shown in FIG. 1) and gives the detected angle to the parking assistance controller 52.

The yaw rate sensor 33 detects a yaw rate of the vehicle and gives the detected rate to the parking assistance controller 52. The shift position sensor 34 detects a position of a shift lever and gives the detected position to the parking assistance controller 52. The parking switch 35 determines whether the parking assistance by the automatic steering is processed or not. The parking switch 35 is provided in a vehicle compartment. A driver can operate the parking switch 35. The handle sensor 36 detects whether the handle is operated or not and gives the detected result to the parking assistance controller 52.

The automatic steering portion 40 has an automatic steering device 41, an automatic braking device 42 and an automatic driving device 43. The automatic steering device 41 receives an instruction from the parking assistance controller 52 and controls the wheels so that the center position of the rear wheel shaft of the vehicle moves toward the target position X automatically. The automatic braking device 42 receives an instruction from the parking assistance controller 52 and brakes the vehicle so that the center position of the rear wheel shaft stops at the target position X. The automatic driving device 43 receives an instruction from the parking assistance controller 52 and drives the vehicle.

The target position calculating portion 51 calculates a first candidate Xs of the target position according to the distance measured by the distance meter 12 and calculates a second candidate Xc of the target position according to the image signal from the imager 11. The target position X, the first candidate Xs of the target position and the second candidate Xc of the target position indicate a position where the center of the rear wheel shaft of the vehicle stops. The target position calculating portion 51 calculates the target position X of the vehicle according to the image signal from the imager 11 and the distance measured by the distance meter 12.

The parking assistance controller 52 controls the automatic steering portion 40 so that the center position of the rear wheel shaft of the vehicle stops at the target position X, when the parking switch 35 is on and the shift position sensor 34 detects that the shift lever is positioned at a reverse position. The parking assistance controller 52 controls the monitor display 20 so as to display information asking a driver if the automatic steering is to be processed or not, before starting the automatic steering. After that, the parking assistance controller 52 starts the automatic steering, when the handle sensor 36 detects that the driver does not operate the handle. It is therefore possible to prevent the automatic steering undesired for the driver.

Figure 2:
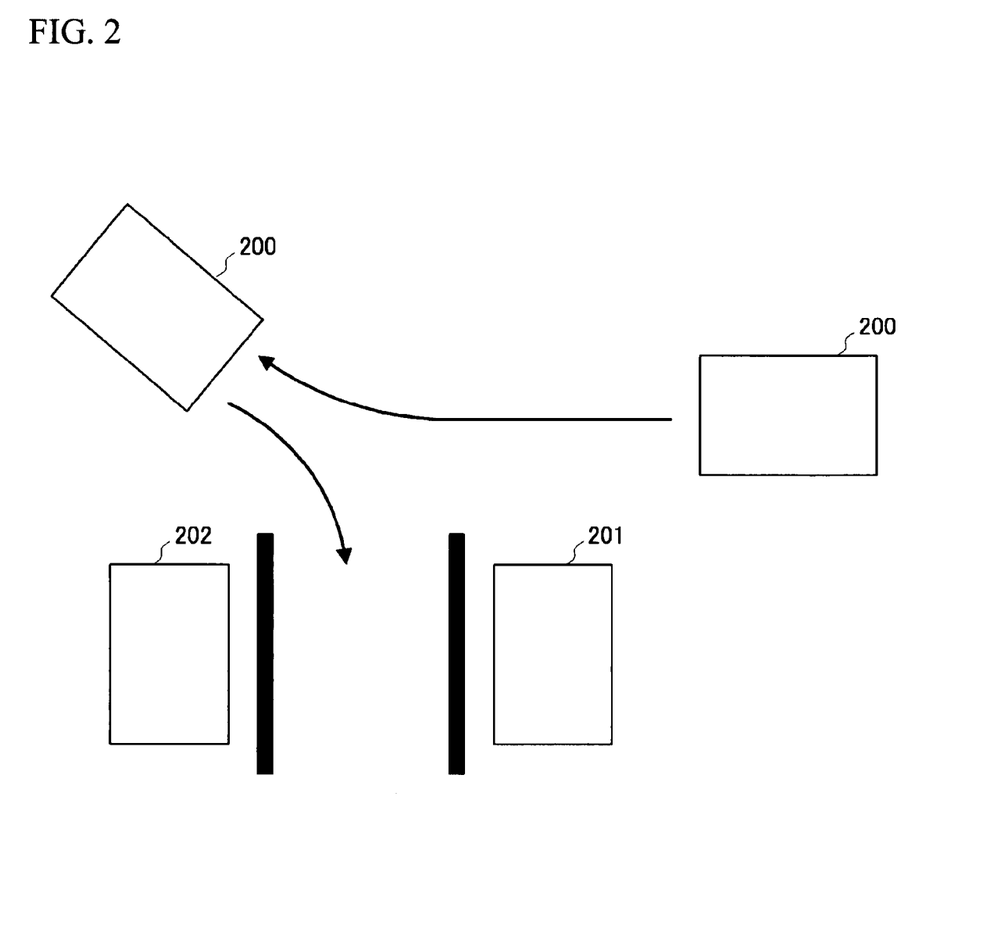
FIG. 2 illustrates an aspect when a vehicle is parked at a parking position.

FIG. 2 illustrates an aspect when a vehicle 200 is parked at a parking position. The parking assistance device 100 shown in FIG. 1 is provided in the vehicle 200. In the embodiment, a description is given of a case where other vehicles are parked at both sides of a parking area. A white line is painted at each side of the parking area. One vehicle parked at closer to the starting position of the vehicle 200 is a vehicle 201, and the other is a vehicle 202.

As shown in FIG. 2, the vehicle 200 passes the vehicle 201 (a first operation). In this case, the vehicle 201 is positioned at left side of the vehicle 200. After that, the vehicle 200 passes the parking area where the vehicles 201 and 202 are not parked. The vehicle 200 curves rightward when passing the vehicle 202 (a second operation), and stops (a third operation). After that, the vehicle 200 goes back toward the parking area (a fourth operation), and stops at a stopping position of the parking area (a fifth operation). The vehicle 200 is parked through the operations. The center position of the rear wheel shaft of the vehicle 200 in a case where the vehicle 200 is parked is referred to as a parking position. A description will be given of an operation of the parking assistance device 100 until the center position of the rear wheel shaft of the vehicle reaches the parking position with the first operations through the fifth operation.

Figure 3:
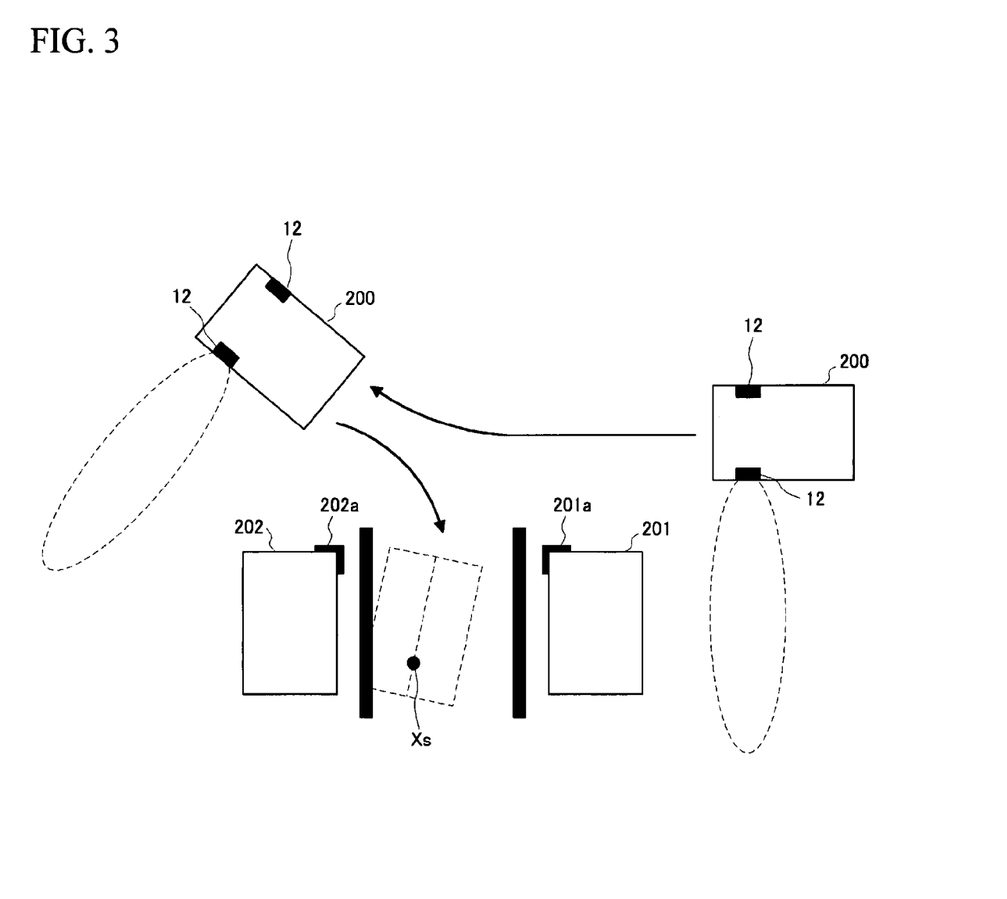
FIG. 3 illustrates a first candidate Xs of a target position calculated according to a measuring result of a distance meter shown in FIG. 1.

FIG. 3 illustrates the first candidate Xs of the target position calculated according to the measuring result of the distance meter 12 shown in FIG. 1. As shown in FIG. 3, the distance meter 12 is provided at each side face of the vehicle 200. The distance meter 12 measures a distance from the vehicle 200 to an obstacle such as other vehicles. The distance meter 12 can measure a distance to the obstacle positioned away from the vehicle by a few meters. A sampling period of the distance meter 12 is, for example, 50 msec.

The distance meter 12 measures a distance to the vehicle 201 in the first operation. Next, the distance meter 12 measures a distance to the end of the parking area and measures a distance to the vehicle 202 in the second operation. The target position calculating portion 51 calculates the first candidate Xs of the target position with a distance to a corner on the parking area side and the vehicle 200 side of the vehicle 201 (hereinafter referred to a corner 201a), with a distance to a corner on the parking area side and the vehicle 200 side of the vehicle 202 (hereinafter referred to a corner 202a) and with the distance to the end of the parking area.

In this case, there is a position error between the first candidate Xs of the target position and the parking position, caused by a measurement accuracy of the distance meter 12 and the shape of the corners 201a and 202a. FIG. 3 illustrates a case where the first candidate Xs of the target position does not correspond to the parking position because of the shape of the corners 201a and 202a. The first candidate Xs of the target position is constant after calculated.

Figure 4:
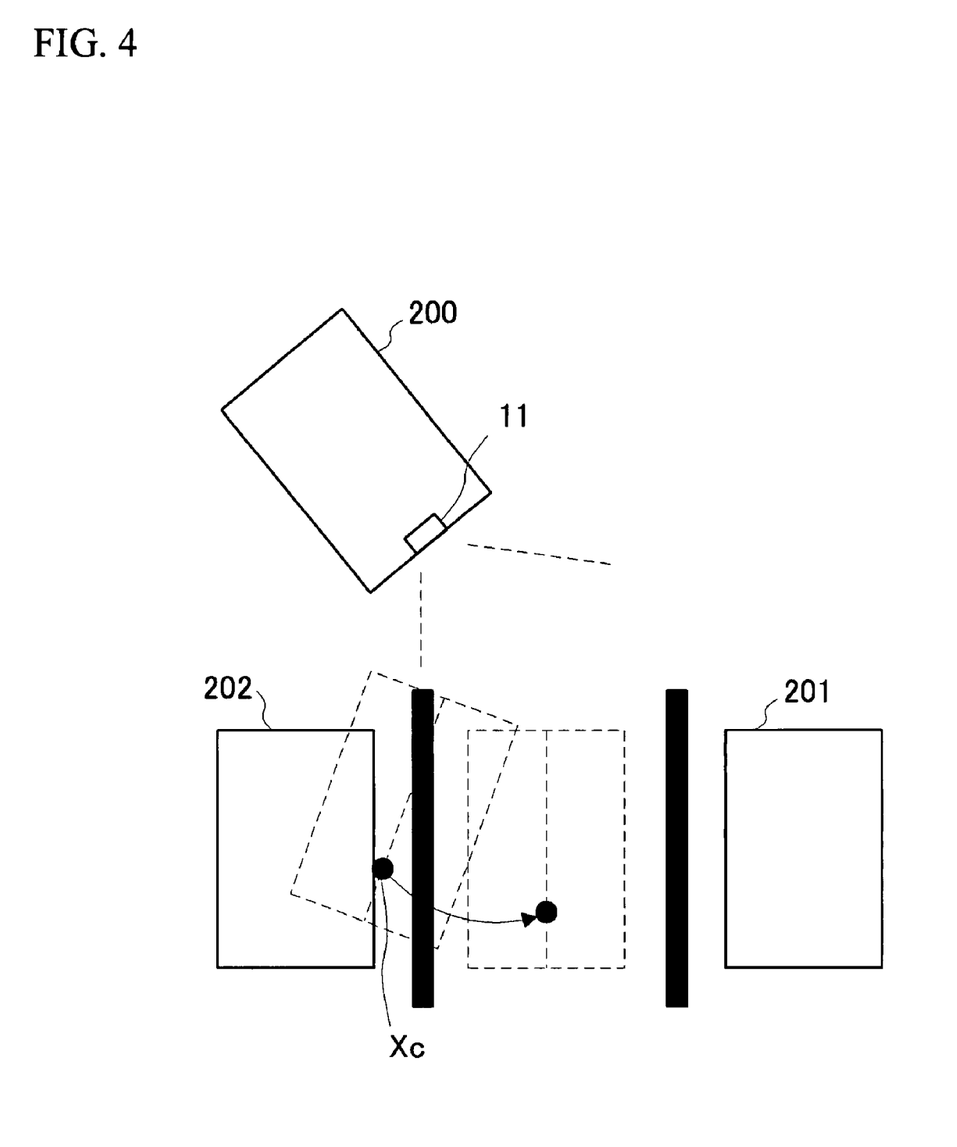
FIG. 4 illustrates a second candidate Xc of a target position calculated according to an image taken by an imager.

FIG. 4 illustrates the second candidate Xc of the target position calculated according to the image taken by the imager 11. As shown in FIG. 4, the imager 11 is provided at back end of the vehicle 200. The imager 11 takes an image of an obstacle backward of the vehicle 200. In the embodiment, the imager 11 takes an image of the white line. A sampling period of the imager 11 is, for example, 100 msec.

The imager 11 takes the image of the white line in the third operation through the fifth operation. The target position calculating portion 51 calculates the second candidate Xc of the target position according to the imaging result of the imager 11. The second candidate Xc of the target position is corrected by the target position calculating portion 51 at every sampling of the imager 11. And the second candidate Xc of the target position changes as the vehicle 200 moves.

There is a position error between the second candidate Xc of the target position and the parking position, caused by a step or a gradient in front of the white line. However, the distance between the imager 11 and the white line is reduced as the center of the rear wheel shaft of the vehicle 200 approaches the parking position. And the imaging accuracy of the imager 11 is improved. Therefore, the position error between the second candidate Xc of the target position and the parking position is reduced. The imager 11 can image the position of the white line accurately when the distance between the imager 11 and the white line is further reduced. And the second candidate Xc of the target position overlaps with the parking position.

The measuring accuracy of the distance meter 12 is generally superior to imaging accuracy of the imager 11 in a case where a distance to an object is large. In contrast, the imaging accuracy of the imager 11 is superior to the measuring accuracy of the distance meter 12 in a case where the distance to the object is small.

Figure 5:
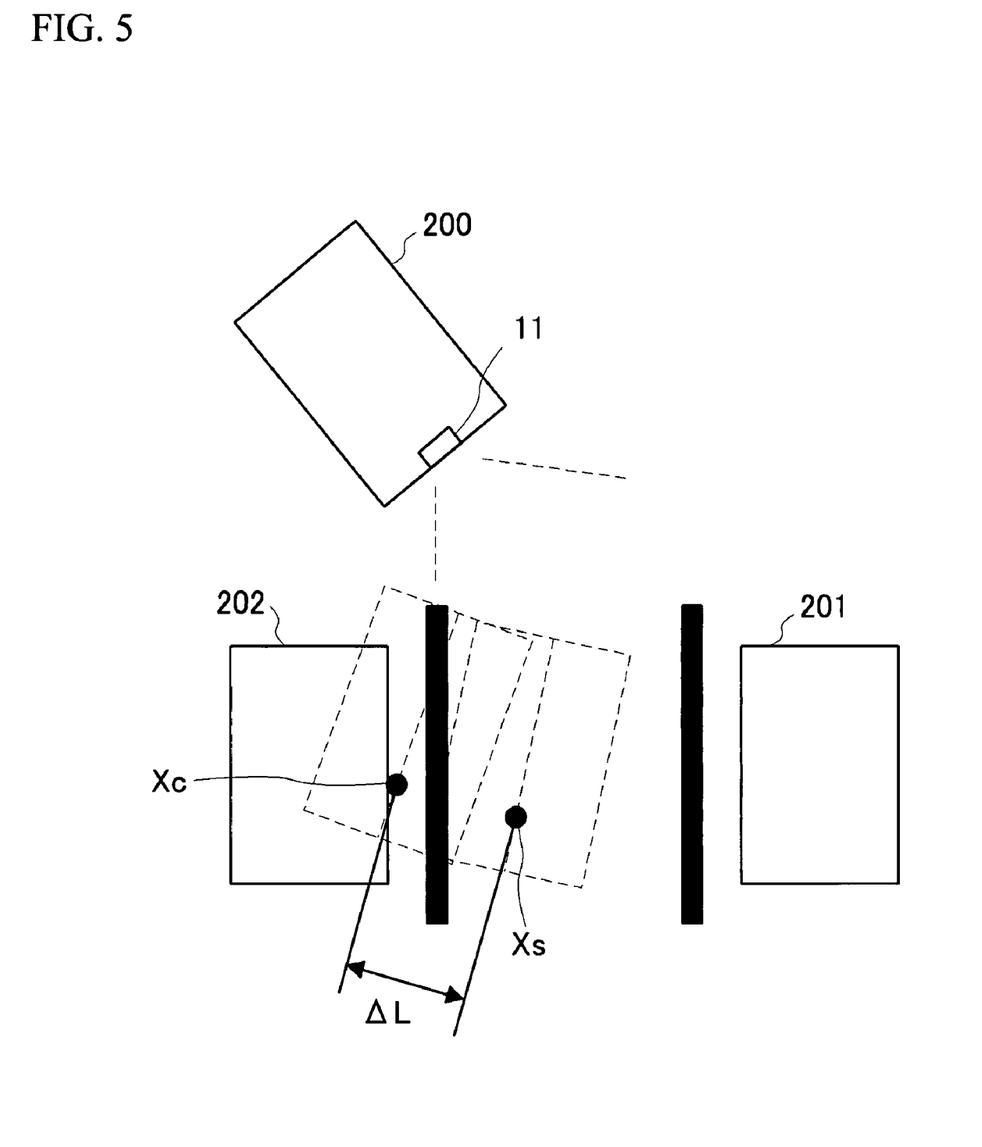
FIG. 5 illustrates a relationship between a first candidate Xs of a target position and a second candidate Xc of a target position.

FIG. 5 illustrates a relationship between the first candidate Xs of the target position and the second candidate Xc of the target position. As shown in FIG. 5, a direct distance between the first candidate Xs of the target position and the second candidate Xc of the target position is hereinafter referred to as ΔL. The position error between the second candidate Xc of the target position and the parking position is larger than that between the first candidate Xc of the target position and the parking position, because the imaging accuracy of the imager 11 is inferior to the measuring accuracy of the distance meter 12 in a case where a distance between the vehicle 200 and the parking position is large. Accordingly, the ΔL is large.

In this case, the target position calculating portion 51 adopts the first candidate Xs of the target position as the target position X. And the parking assistance controller 52 controls the automatic steering device 41, the automatic braking device 42 and the automatic driving device 43 so that the center position of the rear wheel shaft of the vehicle 200 moves toward the first candidate Xs of the target position.

The imaging accuracy of the white line by the imager 11 is improved when the center position of the rear wheel shaft of the vehicle 200 approaches the parking position. Accordingly, the ΔL is reduced. However, the target position calculating portion 51 adopts the first candidate Xs of the target position as the target position X, when the position error between the second candidate Xc of the target position and the parking position is larger than that between the first candidate Xs of the target position and the parking position. In this case, the parking assistance controller 52 controls the automatic steering device 41, the automatic braking device 42 and the automatic driving device 43 so that the center position of the rear wheel shaft of the vehicle 200 moves toward the first candidate Xs of the target position.

The distance between the imager 11 and the white line is further reduced when the center position of the rear wheel shaft of the vehicle 200 further approaches the parking position. Accordingly, the position error between the second candidate Xc of the target position and the parking position gets smaller than that between the first candidate Xs of the target position and the parking position. In the embodiment, the ΔL in the case is set to be 30 cm. The target position calculating portion 51 adopts the second candidate Xc of the target position as the target position X after the ΔL gets smaller than 30 cm. In the embodiment, it is determined that the ΔL is smaller than 30 cm, if the ΔL is smaller than 30 cm for a given time (for example, for a few seconds or for a few sampling period). It is therefore possible to prevent that the second candidate Xc of the target position is adopted as the target position X when the ΔL happens to be smaller than 30 cm in a case where a detecting accuracy of the second candidate Xc of the target position is insufficient.

In this case, the parking assistance controller 52 controls the automatic steering device 41, the automatic braking device 42 and the automatic driving device 43 so that the center position of the rear wheel shaft of the vehicle 200 moves toward the second candidate Xc of the target position. After that, the target position calculating portion 51 adopts the second candidate Xc of the target position as the target position X until the center position of the rear wheel shaft of the vehicle 200 stops at the target position X.

Figure 6:
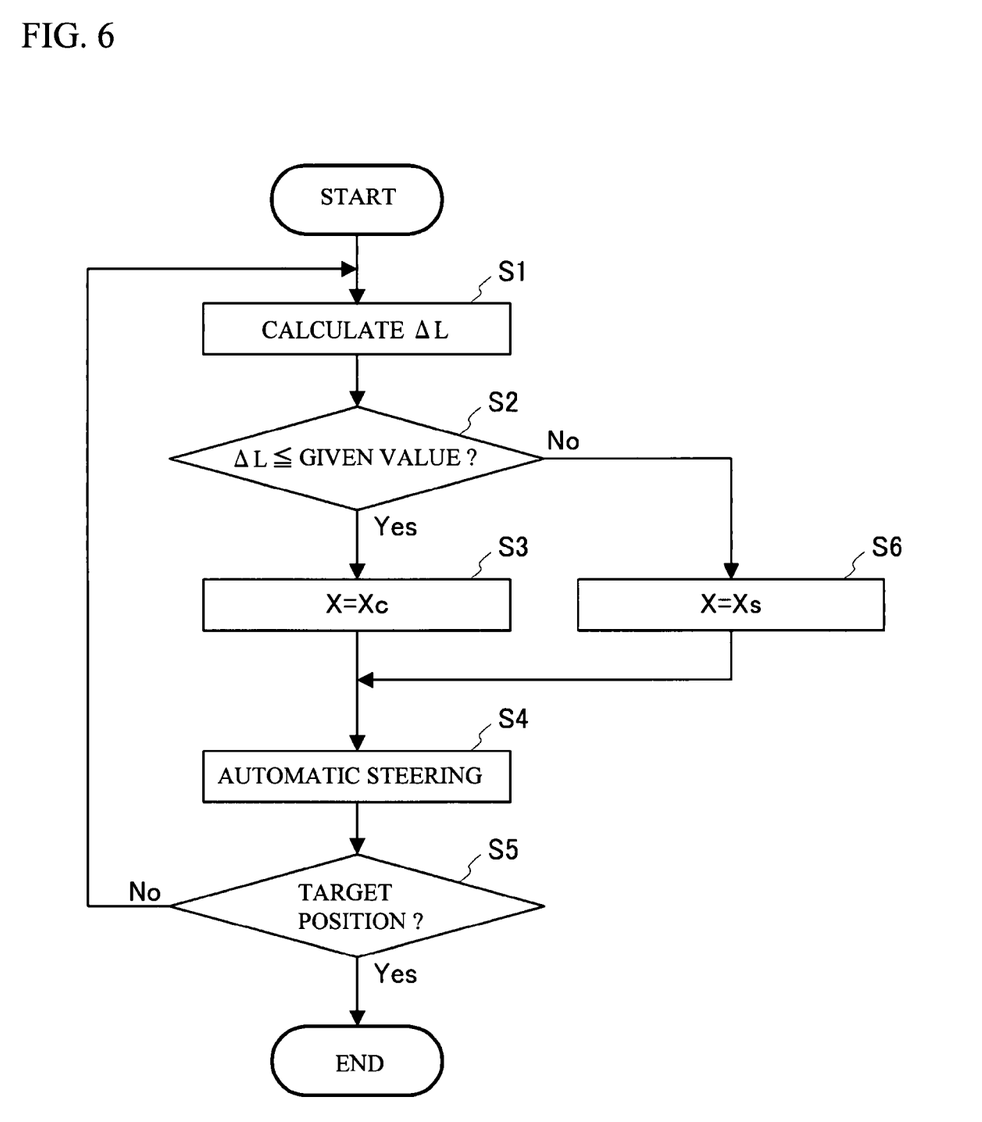
FIG. 6 illustrates a flowchart of an exemplary control sequence of a controller in a case where the controller controls a parking assistance device.

FIG. 6 illustrates a flowchart of an exemplary control sequence of the controller 50 in the case where the controller 50 controls the parking assistance device 100. As shown in FIG. 6, the target position calculating portion 51 calculates the ΔL shown in FIG. 5 (step S1). In this case, the ΔL is calculated with the imaging result of the imager 11 and the measuring result of the distance meter 12.

Next, the target position calculating portion 51 determines whether the ΔL is less than a given value (for example, 30 cm) (step S2). When it is determined that the ΔL is less than the given value in step S2, the target position calculating portion 51 adopts the second candidate Xc as the target position X (step S3). When it is not determined that the ΔL is less than the given value in step S2, the target position calculating portion 51 adopts the first candidate Xs as the target position X (step S6).

Then, the parking assistance controller 52 controls the automatic steering device 41, the automatic braking device 42 and the automatic driving device 43 so that the center position of the rear wheel shaft of the vehicle 200 moves toward the target position X (step S4). Next, the parking assistance controller 52 determines whether the center position of the rear wheel shaft of the vehicle 200 reaches the target position X (step S5). When it is determined that the center position of the rear wheel shaft of the vehicle 200 reaches the target position X in step S5, the parking assistance controller 52 stops the automatic steering.

Through the operations, the controller 50 stops the control of the parking assistance device 100. When it is not determined that the vehicle 200 reaches the target position X in step S5, the controller 50 starts the sequence over from step S1.

As mentioned above, the target position X is set according to the measuring result of the distance meter 12 until the imaging accuracy of the imager 11 surpasses the measuring accuracy of the distance meter 12. And the target position X is set according to the imaging result of the imager 11 after the imaging accuracy of the imager 11 is superior to the measuring accuracy of the distance meter 12. Therefore, the parking assistance device 100 in accordance with the embodiment can set the accurate target position at an adequate time.

The ΔL is not limited, although the ΔL is set to be 30 cm in the embodiment. The ΔL may be changeable according to the imaging accuracy of the imager 11 and the measuring accuracy of the distance meter 12. The target position calculating portion 51 may determine whether the ΔL is less than a given value for a given time (for example, for a few seconds or for a few sampling periods) in step S2 shown in FIG. 6, although the target position calculating portion 51 determines whether the ΔL is less than a given value.

The target position X may be calculated in other way, although the target position X is calculated with the first candidate Xs of the target position and the second candidate Xc of the target position in the embodiment. The second candidate Xc of the target position may be adopted as the target position X in a case where a difference between an inclination of a center line of the vehicle 200 passing through the first candidate Xs of the target position and that passing through the second candidate Xc of the target position gets smaller than a given value.

In the embodiment, the target position calculating portion 51 corresponds to the first calculating portion, the second calculating portion, the determination portion, the setting portion and the provisional setting portion. The parking assistance controller 52 corresponds to the steering assistance portion. The parking switch 35 corresponds to the selection portion. The monitor display 20 corresponds to the information portion. The white line in the parking area corresponds to the environment around the vehicle. Step S2 corresponds to the function of the determination portion. Step S6 corresponds to the function of the provisional setting portion. Step S3 corresponds to the function of the setting portion.

Second Embodiment

A description will be given of a parking assistance device 100a in accordance with a second embodiment. The parking assistance device 100a has the same structure as the parking assistance device 100 in FIG. 1. The parking assistance device 100a is different from the parking assistance device 100 in the calculating method by the target position calculating portion 51. A drawing and an explanation of overall structure of the parking assistance device 100a is omitted, because the parking assistance device 100a has the same structure. A description will be given of a calculating method by the target position calculating portion 51 with reference to FIG. 1. The target position calculating portion 51 in accordance with the second embodiment shifts the target position X from the first candidate Xs of the target position to the second candidate Xc of the target position, when the ΔL is smaller than a given value (for example, 30 cm). The details are given below.

A distance between the center position of the rear wheel shaft of the vehicle 200 and the target position X in a case where the ΔL is smaller than the given value is hereinafter referred to as a distance Dmax. A distance between the center position of the rear wheel shaft of the vehicle 200 and the target position X during the movement of the vehicle 200 is hereinafter referred to as a distance d. In this case, the target position calculating portion 51 adopts a weighted average between the first candidate Xs of the target position and the second candidate Xc of the target position. The target position X in this case is shown as following Expression 1.

$$X = Xs \cdot d/D\max + Xc \cdot (1 - d/D\max) \quad \text{(Expression 1)}$$

In accordance with Expression 1, the ratio of the first candidate Xs of the target position is higher than that of the second candidate Xs of the target position, when the distance between the center position of the rear wheel shaft of the vehicle 200 and the target position X is large. In contrast, the ratio of the second candidate Xc of the target position gets higher as the distance between the center position of the rear wheel shaft of the vehicle 200 and the target position X gets smaller. The imaging result of the imager 11 gets reflected, as the imaging accuracy of the imager 11 gets higher. Accordingly, the target position X is determined. It is therefore prevented that the target position X is changed rapidly. The distance Lmax and the distance l are detected by the distance meter 12, the vehicle speed sensor 31, the steering angle sensor 32, and the yaw rate sensor 33.

Figure 7:
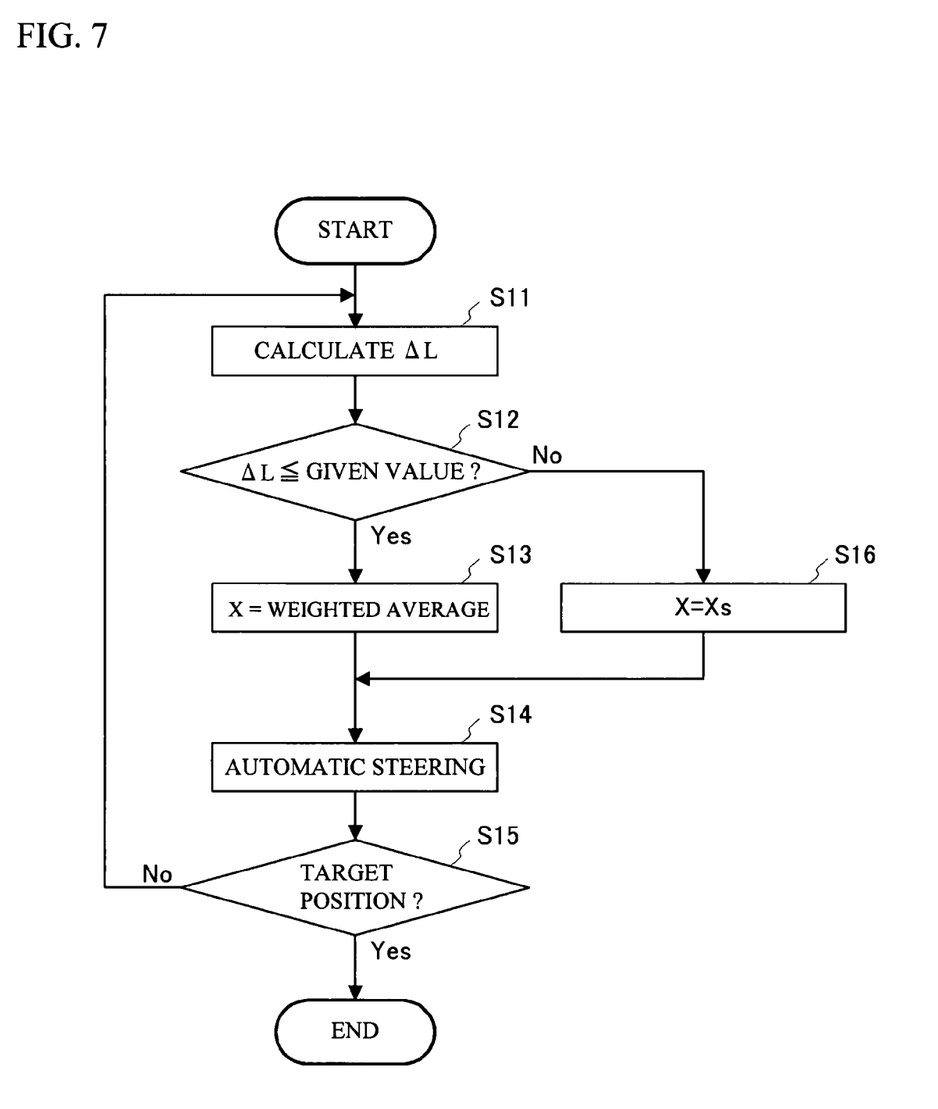
FIG. 7 illustrates a flowchart of an exemplary control sequence of a controller in a case where the controller controls a parking assistance device.

FIG. 7 illustrates a flowchart of an exemplary control sequence of the controller 50 in the case where the controller 50 controls the parking assistance device 100a. As shown in FIG. 7, the target position calculating portion 51 calculates the ΔL shown in FIG. 5 (step S11). Next, the target position calculating portion 51 determines whether the ΔL is less than a given value (for example, 30 cm) (step S12).

When it is determined that the ΔL is less than the given value in step S12, the target position calculating portion 51 adopts the weighted average between the first candidate Xs of the target position and the second candidate Xc of the target position as the target position X (step S13). In this case, the target position calculating portion 51 calculates the target position X with Expression 1. When it is not determined that the ΔL is less than the given value in step S12, the target position calculating portion 51 adopts the first candidate Xs of the target position as the target position X (step S16).

Then, the parking assistance controller 52 controls the automatic steering device 41, the automatic braking device 42 and the automatic driving device 43 so that the center position of the rear wheel shaft of the vehicle 200 moves toward the target position X (step S14). Next, the parking assistance controller 52 determines whether the center position of the rear wheel of the vehicle 200 reaches the target position X (step S15). When it is determined that the center position of the rear wheel of the vehicle 200 reaches the target position X in step S15, the parking assistance controller 52 stops the automatic steering. Through the operations, the controller 50 stops the control of the parking assistance device 100a. When it is not determined that the center position of the rear wheel shaft of the vehicle 200 reaches the target position X in step S15, the controller 50 starts the sequence over from step S11.

As mentioned above, the target position X is set according to the measuring result of the distance meter 12 until the imaging accuracy of the imager 11 surpasses the measuring accuracy of the distance meter 12. And the target position X is set according to the imaging result of the imager 11 and the measuring result of the distance meter 12 after the imaging accuracy of the imager 11 is superior to the measuring accuracy of the distance meter 12. Therefore, the parking assistance device 100a in accordance with the embodiment can set the accurate target position at an adequate time. And the rapid changing of the target position X is prevented.

The target position calculating portion 51 may determine whether the ΔL is less than a given value for a given time (for example, for a few seconds or for a few sampling periods) in step S12 shown in FIG. 7, although the target position calculating portion 51 determines whether the ΔL is less than a given value. The target position X may be changed from the first candidate Xs of the target position to the second candidate Xc of the target position in steps, although the target position X is changed continuously from the first candidate Xs of the target position to the second candidate Xc of the target position in accordance with Expression 1 in the embodiment.

In Expression 1, the target position X corresponds to the second candidate Xc of the target position when the distance d corresponds to the distance Dmax. However, the target position X may correspond to the second candidate Xc of the target position in a case where the distance d has an offset and the distance d is smaller than the distance Dmax. For example, Expression 2 and Expression 3 may be used instead of Expression 1. The distance d' is a value in which the offset value α (>0) is added to the distance d. The maximum of the distance d' is the distance Dmax. The target position calculating portion 51 adopts the second candidate Xc of the target position as the target position X after the distance d' corresponds to the distance Dmax in a case where Expression 2 and Expression 3 are used.

$$X = Xs \cdot d'/Dmax + Xc \cdot (1 - d'/Dmax) \quad \text{(Expression 2)}$$

$$Dmax \geq d' = d + \alpha \quad \text{(Expression 3)}$$

Third Embodiment

Next, a description will be given of a parking assistance device 100b in accordance with a third embodiment. The parking assistance device 100b has the same structure as the parking assistance device 100 in FIG. 1. The parking assistance device 100b is different from the parking assistance device 100 in the calculating method by the target position calculating portion 51. A drawing and an explanation of overall structure of the parking assistance device 100b is omitted, because the parking assistance device 100b has the same structure. A description will be given of a calculating method by the target position calculating portion 51 with reference to FIG. 1. In addition, the parking assistance controller 52 has a timer function. The target position calculating portion 51 in the third embodiment shifts the target position X from the first candidate Xs of the target position to the second candidate Xc of the target position gradually, when the ΔL is smaller than a given value (for example, 30 cm). The details are given below.

A predicted time is hereinafter referred to as a time Smax. The predicted time is from a point when the ΔL is smaller than the given value to a point when the center position of the rear wheel shaft of the vehicle 200 will reach the target position X. And an elapsed time from the point when the ΔL is smaller than the given value is hereinafter referred to as a time S. The time S increases during the automatic steering. In the embodiment, the target position calculating portion 51 adopts a weighted average between the first candidate Xs of the target position and the second candidate Xc of the target position as the target position X. The target position X in this case is shown in following Expression 4.

$$X = Xs(1 - S/Smax) + Xc \cdot S/Smax \quad \text{(Expression 4)}$$

In accordance with Expression 4, the ratio of the first candidate Xs of the target position is higher than that of the second candidate Xc of the target position, when the distance between the center position of the rear wheel of the vehicle 200 and the target position X is large. In contrast, the ratio of the second candidate Xc of the target position gets higher as the distance between the center position of the rear wheel shaft of the vehicle 200 and the target position X gets smaller. The imaging result of the imager 11 gets reflected, as the imaging accuracy of the imager 11 gets higher. Accordingly, the target position X is determined. It is therefore prevented that the target position X is changed rapidly.

The time Smax is calculated with the distance Lmax shown in the second embodiment, a steering angle of the vehicle 200 detected by the steering angle sensor 32, and a vehicle speed during the automatic steering of the vehicle 200. The time S is calculated with use of the timer function of the parking assistance controller 52.

A flowchart in the case where the controller 50 controls the parking assistance device 100b is different from that of FIG. 7 in a point where Expression 4 is used in step S13 in FIG. 7.

In this case, the target position X is set according to the measuring result of the distance meter 12 until the imaging accuracy of the imager 11 surpasses the measuring accuracy of the distance meter 12. And the target position X is set according to the imaging result of the imager 11 and the measuring result of the distance meter 12 after the imaging accuracy of the imager 11 is superior to the measuring accuracy of the distance meter 12. Therefore, the parking assistance device 100b in accordance with the embodiment can set the accurate target position at an adequate time. And the rapid changing of the target position X is prevented.

The target position calculating portion 51 may determine whether the ΔL is less than a given value for a given time (for example, for a few seconds or for a few sampling periods) in step S12 shown in FIG. 7, although the target position calculating portion 51 determines whether the ΔL is less than a given value. It is preferred that the counting of the time S by the parking assistance controller 52 is stopped when the vehicle 200 stops on the way during the automatic steering. It is because that the distance decrement between the center position of the rear wheel shaft of the vehicle 200 and the target position X is stopped.

The target position X may be changed from the first candidate Xs of the target position to the second candidate Xc of the target position in steps, although the target position X is changed continuously from the first candidate Xs of the target position to the second candidate Xc of the target position in accordance with Expression 4 in the embodiment.

In Expression 4, the target position X corresponds to the second candidate Xc of the target position when the time S corresponds to the time Smax. However, the target position X may correspond to the second candidate Xc of the target position in a case where the time S has an offset and the time S is smaller than the time Smax. For example, Expression 5 and Expression 6 may be used instead of Expression 4. The time S' is a value in which the offset value β(>0) is added to the time S. The maximum of the time S' is the time Smax. The target position calculating portion 51 adopts the second candidate Xc of the target position as the target position X after the time S' corresponds to the time Smax in a case where Expression 5 and Expression 6 are used.

$$X = Xs \cdot (1 - S'/S\max) + Xc \cdot S'/S\max \quad \text{(Expression 5)}$$

$$S\max \geq S' = S + \beta \quad \text{(Expression 6)}$$

Fourth Embodiment

Next, a description will be given of a parking assistance device 100c in accordance with a fourth embodiment. The parking assistance device 100c has the same structure as the parking assistance device 100 in FIG. 1. The parking assistance device 100c is different from the parking assistance device 100 in the calculating method by the target position calculating portion 51. A drawing and an explanation of overall structure of the parking assistance device 100c is omitted, because the parking assistance device 100c has the same structure. A description will be given of a calculating method by the target position calculating portion 51 with reference to FIG. 1. The target position calculating portion 51 in the third embodiment shifts the target position X from the first candidate Xs of the target position to the second candidate Xc of the target position gradually, when the ΔL is smaller than a given value (for example, 30 cm). The details are given below.

Figure 8A:
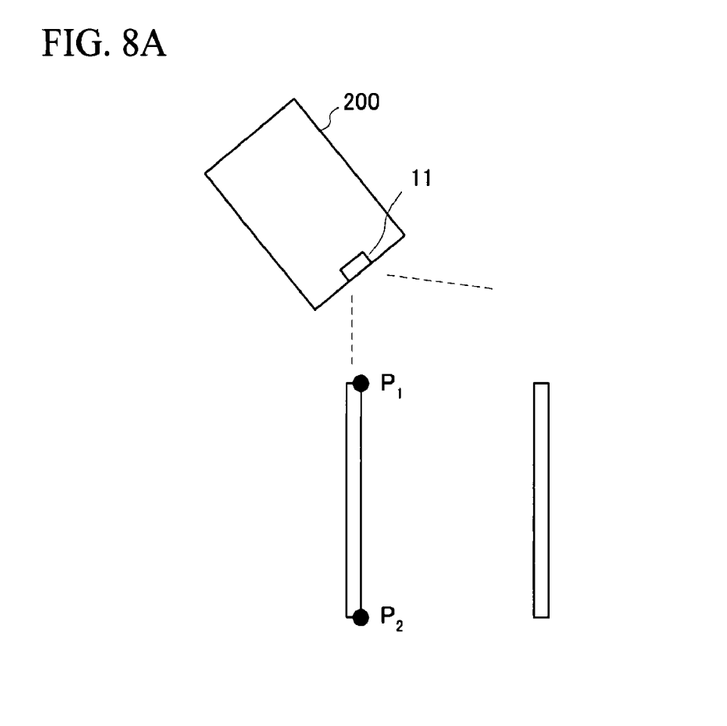
FIG. 8A and FIG. 8B illustrate an aspect when an imager counts an edge point of a white line.
Figure 8B:
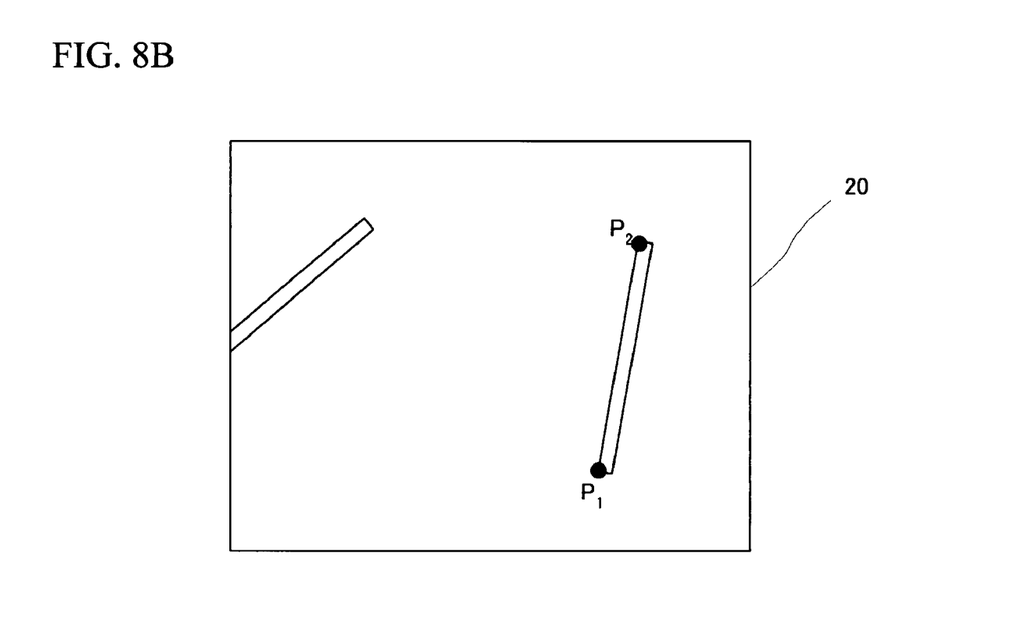

FIG. 8A and FIG. 8B illustrate an aspect when the imager 11 counts an edge point of the white line. FIG. 8A illustrates a relationship between the vehicle 200 and the white line. FIG. 8B illustrates a screen of the monitor display 20 where an image taken by the imager 11 is displayed.

As shown in FIG. 8A, a point P1 is one of two dots connecting both ends of one of the white lines of the parking area. A point P2 is the other. The point P1 and the point P2 are displayed on the monitor display 20 according to the imaging result of the imager 11. Brightness edges are detected on the line from the point P1 to the point P2 in a case where a CCD camera is used as the imager 11. The number of the brightness edges is referred to as a number N. The maximum of the number N is referred to as Nmax. The minimum of the number N is referred to as Nmin.

The X-Y coordinates of the points P1 and P2 according to the resolution of the imager 11 are shown as (X1, Y1) and (X2, Y2) respectively. In this case, the Nmax is |Y1−Y2|+1 and the Nmin is zero, because it is possible that the brightness edge is not detected because of the imaging accuracy of the imager 11. The number N increases, as the imaging accuracy of the imager 11 gets higher. Reliability R of the imager 11 is therefore shown as Expression 7.

$$R = N/(|Y1 - Y2| + 1) \quad \text{(Expression 7)}$$

Next, s description will be given of a calculating method by the target position calculating portion 51. The target position calculating portion 51 adopts a weighted average between the first candidate Xs of the target position and the second candidate Xc of the target position as the target position X. The target position X in this case is shown in Expression 8.

$$X = Xs \cdot (1 - R) + Xc \cdot R \quad \text{(Expression 8)}$$

In accordance with Expression 8, the imaging result of the imager 11 gets reflected, as the imaging accuracy of the imager 11 gets higher. Accordingly, the target position X is determined. And the rapid changing of the target position X is prevented. In the embodiment, the reliability R may have an offset similarly to the second and the third embodiments. The reliability R means a ratio of the second candidate Xc of the target position in Expression 8.

A flowchart in the case where the controller 50 controls the parking assistance device 100c is different from that of FIG. 7 in a point where Expression 8 is used in step S13 in FIG. 7.

In this case, the target position X is set according to the measuring result of the distance meter 12 until the imaging accuracy of the imager 11 surpasses the measuring accuracy of the distance meter 12. And the target position X is set according to the imaging result of the imager 11 and the measuring result of the distance meter 12 after the imaging accuracy of the imager 11 is superior to the measuring accuracy of the distance meter 12. Therefore, the parking assistance device 100c in accordance with the embodiment can set the accurate target position at an adequate time. And the rapid changing of the target position X is prevented.

The target position calculating portion 51 may determine whether the ΔL is less than a given value for a given time (for example, for a few seconds or for a few sampling periods) in step S12 shown in FIG. 7, although the target position calculating portion 51 determines whether the ΔL is less than a given value. The target position X may be changed from the first candidate Xs of the target position to the second candidate Xc of the target position in steps, although the target position X is changed continuously from the first candidate Xs of the target position to the second candidate Xc of the target position in accordance with Expression 8 in the embodiment.

The target position X may be calculated in other way, although the target position X is calculated with the first candidate Xs of the target position and the second candidate Xc of the target position in second embodiment through the fourth embodiment. The weighted average between the first candidate Xs of the target position and the second candidate Xc of the target position may be adopted as the target position X in a case where a difference between an inclination of a center line of the vehicle 200 passing through the first candidate Xs of the target position and that passing through the second candidate Xc of the target position gets smaller than a given value. In the second embodiment through the fourth embodiment, step S12 in FIG. 7 corresponds to the function of the determination portion. Step S16 corresponds to the function of the provisional setting portion. Step S13 corresponds to the function of the setting portion.

The second candidate Xc of the target position may be calculated according to a concrete block provided in the parking area, although the second candidate Xc of the target position is calculated according to the white line of the parking area in the first embodiment through the fourth embodiment.

The target position may be set according to the first candidate Xs of the target position only, before the relationship between the first candidate Xs of the target position and the second candidate Xc of the target position meets a given condition. That is, the target position X may be set according to the first candidate Xs of the target position, when it is determined that the relationship between the first candidate Xs of the target position and the second candidate Xc of the target position does not meet a given condition before the target position X is set according to the second candidate Xc of the target position. And the target position X may be set according to the second candidate Xc of the target position, when it is determined that the relationship between the first candidate Xs of the target position and the second candidate Xc of the target position meets the given condition after the target position X is set according to the first candidate Xs of the target position. With the structure, it is possible to set the target position X accurately even if when it is determined that the relationship between the first candidate Xs of the target position and the second candidate Xc of the target position does not meet the given condition because of the malfunction or the detection error of the distance meter after it is determined that the detection accuracy of the second candidate Xc of the target position is sufficient, because the target position X is set according to the second candidate Xc detected accurately.

The invention claimed is:

1. A target position setting device comprising:
a distance meter that measures a distance to an object around a vehicle;
an imager that takes an image of an environment around the vehicle;
a first calculating portion that calculates a first candidate of a target position of the vehicle according to a measuring result of the distance meter;
a second calculating portion that calculates a second candidate of the target position of the vehicle according to an imaging result of the imager;
a determination portion that determines whether a relationship between the first candidate of the target position and the second candidate of the target position meets a given condition; and
a setting portion that sets the target position according to the second candidate of the target position when the determination portion determines that the relationship between the first candidate of the target position and the second candidate of the target position meets the given condition,
wherein the given condition is a case in which a distance between the first candidate of the target position and the second candidate of the target position is smaller than a first given value for more than a first given time or a case where a difference between a first inclination of a center line of the vehicle passing through the first candidate of the target position and a second inclination of the center line of the vehicle passing through the second candidate of the target position is smaller than a second given value for more than a second given time.

2. The target position setting device as claimed in claim 1, wherein the imager includes a charge coupled device camera that takes the image within a given angle range backward of the vehicle, and the imager converts the image into an image signal which is transmitted to the first calculating portion.

3. The target position setting device as claimed in claim 1, wherein the distance meter includes an ultrasonic sonar or a radar that measures the distance to the object and transmits the measured distance to the second calculating portion.

4. A target position setting device comprising:
a distance meter that measures a distance to an object around a vehicle;
an imager that takes an image of an environment around the vehicle;
a first calculating portion that calculates a first candidate of a target position of the vehicle according to a measuring result of the distance meter;
a second calculating portion that calculates a second candidate of the target position of the vehicle according to an imaging result of the imager;
a determination portion that determines whether a relationship between the first candidate of the target position and the second candidate of the target position meets a given condition;
a setting portion that sets the target position according to the second candidate of the target position when the determination portion determines that the relationship between the first candidate of the target position and the second candidate of the target position meets the given condition; and
provisional setting portion that sets the target position according to the first candidate of the target position when the determination portion determines that the relationship between the first candidate of the target position and the second candidate of the target position does not meet the given condition,
wherein the setting portion sets the target position again according to the second candidate of the target position when the determination portion determines that the relationship between the first candidate of the target position and the second candidate of the target position meets the given condition after the provisional setting portion sets the target position according to the first candidate of the target position.

5. The target position setting portion as claimed in claim 4, wherein the setting portion changes the target position gradually from the first candidate of the target position to the second candidate of the target position.

6. The target position setting device as claimed in claim 5, wherein the given condition is a case in which a distance between the first candidate of the target position and the second candidate of the target position is smaller than a given value for more than a given time.

7. The target position setting device as claimed in claim 4, wherein the given condition is a case in which a distance between the first candidate of the target position and the second candidate of the target position is smaller than a given value for more than a given time.

8. A parking assistance device comprising:
a target position setting device including a distance meter, an imager, a first calculating portion, a second calculating portion, a determination portion, and a setting portion,
the distance meter measuring a distance to an object around a vehicle,
the imager taking an image of an environment around the vehicle,
the first calculating portion calculating a first candidate of a target position of the vehicle according to a measuring result of the distance meter,
the second calculating portion calculating a second candidate of the target position of the vehicle according to an imaging result of the imager,
the determination portion determining whether a relationship between the first candidate of the target position and the second candidate of the target position meets a given condition,
the setting portion setting the target position according to the second candidate of the target position when the determination portion determines that the relationship between the first candidate of the target position and the second candidate of the target position meets the given condition; and
a steering assistance portion that starts a steering assistance by an automatic steering when the determination portion determines that the relationship between the first candidate of the target position and the second candidate of the target position meets the given condition,
wherein the given condition is a case in which a distance between the first candidate of the target position and the second candidate of the target position is smaller than a first given value for more than a first given time or a case where a difference between a first inclination of a center line of the vehicle passing through the first candidate of the target position and a second inclination of the center line of the vehicle passing through the second candidate of the target position is smaller than a second given value for more than a second given time.

9. The parking assistance device as claimed in claim 8, further comprising a selection portion that determines whether the steering assistance by the steering assistance portion is to be processed.

10. The parking assistance device as claimed in claim 8, further comprising an information portion that informs starting of the steering assistance to a driver when the steering assistance portion starts the steering assistance.

11. The parking assistance device as claimed in claim 8, wherein the imager includes a charge coupled device camera that takes the image within a given angle range backward of the vehicle, and the imager converts the image into an image signal which is transmitted to the first calculating portion.

12. The parking assistance device as claimed in claim 8, wherein the distance meter includes an ultrasonic sonar or a radar that measures the distance to the object and transmits the measured distance to the second calculating portion.

13. A parking assistance device comprising:
a target position setting device including a distance meter, an imager, a first calculating portion, a second calculating portion, a determination portion, and a setting portion,
the distance meter measures a distance to an object around a vehicle,
the imager takes an image of an environment around the vehicle,
the first calculating portion calculates a first candidate of a target position of the vehicle according to a measuring result of the distance meter,
the second calculating portion calculates a second candidate of the target position of the vehicle according to an imaging result of the imager,
the determination portion determines whether a relationship between the first candidate of the target position and the second candidate of the target position meets a given condition,
the setting portion sets the target position according to the second candidate of the target position when the determination portion determines that the relationship between the first candidate of the target position and the second candidate of the target position meets the given condition; and
a steering assistance portion that starts a steering assistance by an automatic steering when the determination portion determines that the relationship between the first candidate of the target position and the second candidate of the target position meets the given condition, wherein
the target position setting device further includes a provisional setting portion that sets the target position according to the first candidate of the target position when the determination portion determines that the relationship between the first candidate of the target position and the second candidate of the target position does not meet the given condition, and
the setting portion sets the target position again according to the second candidate of the target position when the determination portion determines that the relationship between the first candidate of the target position and the second candidate of the target position meets the given condition after the provisional setting portion sets the target position according to the first candidate of the target position.

14. The parking assistance device as claimed in claim 13, wherein the setting portion changes the target position gradually from the first candidate of the target position to the second candidate of the target position.

15. The parking assistance device as claimed in claim 14, wherein the given condition is a case in which a distance between the first candidate of the target position and the second candidate of the target position is smaller than a given value for more than a given time.

16. The parking assistance device as claimed in claim 13, wherein the given condition is a case in which a distance between the first candidate of the target position and the second candidate of the target position is smaller than a given value for more than a given time.

* * * * *

UNITED STATES PATENT AND TRADEMARK OFFICE
CERTIFICATE OF CORRECTION

| | | |
|---|---|---|
| PATENT NO. | : 7,903,842 B2 | Page 1 of 1 |
| APPLICATION NO. | : 11/663065 | |
| DATED | : March 8, 2011 | |
| INVENTOR(S) | : Hisashi Satonaka | |

It is certified that error appears in the above-identified patent and that said Letters Patent is hereby corrected as shown below:

On the title page, Item (86), the PCT No. is incorrect. Item (86) should read:

-- (86) PCT No.:  PCT/JP2006/308184

§ 371 (c)(1),
(2), (4) Date:  Mar. 16, 2007 --

Signed and Sealed this
Seventeenth Day of May, 2011

David J. Kappos
*Director of the United States Patent and Trademark Office*